(12) United States Patent
Schmit et al.

(10) Patent No.: US 8,972,730 B2
(45) Date of Patent: Mar. 3, 2015

(54) SYSTEM AND METHOD OF USING A SIGNED GUID

(71) Applicant: Honeywell International Inc., Morristown, NJ (US)

(72) Inventors: Thomas Paul Schmit, Huntington, NY (US); John Robert Probin, South Lanarkshire (GB); Tom Richard Markham, Fridley, MN (US); Mark H. Schmidt, West Islip, NY (US); Jean U. Millien, New York, NY (US); Kerry Warren Podolsky, Dix Hills, NY (US)

(73) Assignee: Honeywell International Inc., Morristown, NJ (US)

( * ) Notice: Subject to any disclaimer, the term of this patent is extended or adjusted under 35 U.S.C. 154(b) by 15 days.

(21) Appl. No.: 13/789,764

(22) Filed: Mar. 8, 2013

(65) Prior Publication Data

US 2014/0258727 A1    Sep. 11, 2014

(51) Int. Cl.
*H04L 29/06* (2006.01)
*G06F 21/00* (2013.01)
*G06F 21/31* (2013.01)

(52) U.S. Cl.
CPC .................................. *G06F 21/31* (2013.01)
USPC ........................................ 713/170; 713/156

(58) Field of Classification Search
CPC ............ H04L 63/0823; H04L 63/0876; H04L 63/126; H04L 63/0869; H04L 63/0884; H04L 9/32
See application file for complete search history.

(56) References Cited

U.S. PATENT DOCUMENTS

| | | | |
|---|---|---|---|
| 2002/0166048 A1* | 11/2002 | Coulier | 713/169 |
| 2005/0086468 A1 | 4/2005 | Meandzija et al. | |
| 2008/0184030 A1* | 7/2008 | Kelly et al. | 713/156 |
| 2011/0113238 A1 | 5/2011 | Jennings et al. | |
| 2011/0225427 A1 | 9/2011 | Wood et al. | |
| 2011/0276803 A1 | 11/2011 | Bender et al. | |
| 2014/0189890 A1* | 7/2014 | Koeberl et al. | 726/34 |

OTHER PUBLICATIONS

Zigbee Alliance and Homeplug Powerline Alliance Liaison, Smart Energy Profile 2.0 Application Protocol Specification, Jul. 2012.
Great Britain Combined Search and Examination Report for corresponding GB application 1403945.7, dated Aug. 28, 2014.

* cited by examiner

*Primary Examiner* — Izunna Okeke
(74) *Attorney, Agent, or Firm* — Husch Blackwell LLP

(57) ABSTRACT

A method and apparatus wherein the method includes the steps of generating a globally unique identifier (GUID) for a security system appliance, saving a public key and private key of the security system appliance in a memory of the security system appliance, a manufacturer of the security system appliance generating a signed version of the GUID and the public key, saving the signed version of the GUID and public key in the memory of the security system appliance, the security system appliance sending a registration message including the signed version of the GUID and public key to a security system server and the security system server authenticating the security system appliance using the signed version of the GUID and public key of the security system appliance and a public key of the manufacturer.

20 Claims, 1 Drawing Sheet

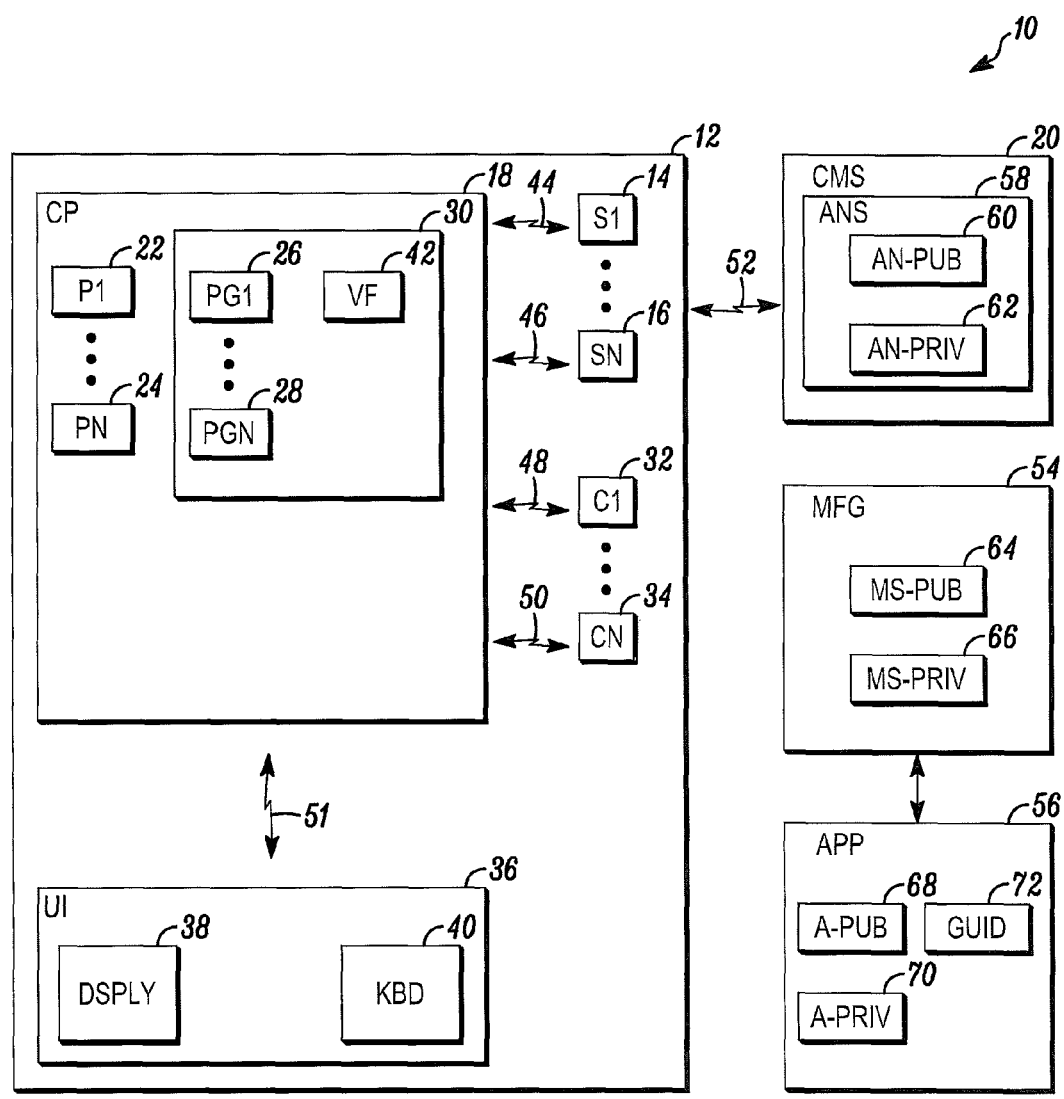

SYSTEM AND METHOD OF USING A SIGNED GUID

FIELD

The field relates to security systems and more particularly to methods and processes of setting up security systems.

BACKGROUND

Security systems are generally known. Such systems typically include one or more sensors and a controller. The sensors may include limit switches used on doors and windows to detect intruders or the sensors may be environmental detectors (e.g., fire, smoke, natural gas, etc.).

The controller monitors the sensors for threats and upon detection of a threat sends an alarm message to a central monitoring station. The controller may also activate a local alarm to alert occupants to the threat.

While the controllers and sensors of security systems work well, they are often difficult to set up. One of the difficulties associated with set up of the sensors lies in the use of an appropriate addressing system. In this regard, a technician may be required to enter an address through a set of DIP switches located within each sensor.

More recent systems use automated methods where a controller discovers each sensor upon activation of the sensor. However, it is often difficult to determine where a discovered sensor is located or even whether the sensor is authorized for use within the system. In this case, a technician may first need to locate the device and then determine if the device is of a type intended for use within the system. Accordingly, a better method is needed for setup of such systems.

BRIEF DESCRIPTION OF THE DRAWING

FIG. 1 is a block diagram of a security system shown generally in accordance with an illustrated embodiment.

DETAILED DESCRIPTION OF AN ILLUSTRATED EMBODIMENT

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. Included within the system may be a number of sensors 14, 16 that detect threats within a secured area 12. The sensors may be limit switches placed on doors or windows along a periphery of the secured area in order to detector intruders or the sensors may be environmental sensors placed throughout the secured area to detect environmental threats. Where the sensors include one or more environmental detectors, the detectors may be based upon any of a number of different technologies (e.g., smoke detection, ionization detection, natural gas detection, etc.).

Also included within the system may be a control panel 18. The control panel may monitor the sensors for threats and upon detection of a threat via activation of one of the sensors, send an alarm message to a central monitoring station 20. The central monitoring station may respond by summoning the appropriate help (e.g., police, fire department, etc.).

Located within the control panel is one or more processor apparatus (processors) 22, 24 operating under control of one or more computer programs 26, 28 loaded from a non-transitory computer readable medium (memory) 30. As used herein, reference to a step performed by a computer program is also a reference to the processor that executed that step.

Also included within the secured area may be one or more cameras 32, 34. The cameras may be monitored via a user interface 36. In this regard, a human guard may select one of the cameras via a keyboard 40 and view video frames from the selected camera through a display 38. The video from each of the cameras may also be saved into a respective video file 42.

Each of the sensors and cameras may be connected to the alarm panel via a wired or wireless connection 44, 46, 48, 50, 51. Similarly, the alarm panel may be connected to the central monitoring station via a wired or wireless connection 52.

In general, an alarm processor may monitor each of the sensors. Upon the detection of a threat via activation of one of the sensors, the alarm processor may compose an alarm message and send the message to the central monitoring station.

Alternatively, a video processor may detect activation of one of the sensors and, in response, activate one of the cameras. Video from the camera may be saved in a video file 42 as evidence of the event.

Set up of the system may occur automatically and without human involvement. In this regard, a security system appliance 56 may receive (and save into an internal memory) a global unique identifier (GUID) 70 and a signed version of the GUID and a public key of the appliance from a manufacturer 54 of the appliance during manufacture of the appliance.

The GUID may be any appropriate identifier of the appliance. The signed GUID (and public key of the appliance) may be signed during manufacture by an encryption processor executing an asymmetric cipher (program) that uses a private key of the manufacturer to generate the signed version of the GUID and public key of the appliance. In general, an asymmetric cipher operates by using two separate keys of a key pair that includes a public key and a private key. One key encrypts (signs) the GUID and the other decrypts (recovers) the GUID. Neither key can perform both functions (i.e., encryption and decryption) by itself.

In general, a number of private key and public key pairs may be used to facilitate automatic registration of the appliance. For example, an alarm network (security system) server 58 may use a corresponding encryption processor to generate a mathematically linked public key (AN-pub) 60 and private key (AN-priv) 62 pair to authenticate and protect communications between other devices and the server. Similarly, an encryption processor of the manufacturer may generate the public key (MS-pub) 64 and private key (MS-priv) 66 for use in authentication of the appliances. Finally, the encryption processor of the manufacture (or a separate encryption processor) present within the appliance may generate a public key (A-pub) 68 and private key (A-priv) 70 for the appliance that is saved within the appliance. As with the other public and private keys discussed herein, the public and private keys of the appliance are mathematically linked via an asymmetric cipher. The private key of the appliance is saved in a protected location within the appliance.

In addition to the GUID, the signed version of the GUID and public key (i.e., MS-priv[GUID, A-pub]), each appliance may also have a copy of a number of public keys of other devices stored in a memory of the respective appliance for purposes that will explained in more detail below. For example, the memory of each appliance may include a copy of the public key (MS-pub) of the manufacturer and the public key (AN-pub) of the server.

The security system appliance 56 shown in FIG. 1 is used herein to represent any of a number of different components of the security system. For example, the security system appliance may be any one of the control panel, the user interface or any one of the sensors or cameras.

Each of the appliances is constructed to automatically register itself with a corresponding parent device, set up a channel with that device and begin communicating with that device. For example, each of the sensors and cameras registers itself with the control panel and forms a secure communication channel with the control panel. Similarly, the control panel registers itself with the central monitoring station and forms a secure channel with the central monitoring station.

For example, upon activation, each security system appliance begins transmitting a registration message (RM) including at least the signed version of the GUID and public key of the appliance (RM→QS-priv[GUID,A-pub]). The parent of the appliance may receive the registration signal, authenticate the appliance and set up a secured channel between the appliance and parent device.

As a more specific example, the control panel 18 may send a registration message (RM) to the alarm network server 58 having the format (RM→MS-priv[GUID,A-pub]). The encryption processor of the server uses its own local copy of the manufacture's public key (MS-pub) to recover the unsigned version of GUID and public key of the appliance (A-pub) from the respective signed version. Upon recovering the unsigned GUID and public key of the appliance, the control panel is, thereby, authenticated to the server. The server saves the public key (A-pub) of the control panel for later use in communicating with the control panel.

Using the encryption processor (or another processor), the server may then generate a pairwise symmetric key (AN-A-sym) that will be used to establishing secure sessions between the server and the control panel. In this case, the term pairwise symmetric key means that the same key is used to encode information as is used to decode that information.

The server next encrypts the pairwise symmetric key using the public key (A-pub) of the control panel to produce a first encrypted result (R1) where R1→A-pub[An-A-sym]. The first result R1 is further encrypted using the private key of the server AN-priv to produce a second encrypted result (R2), where R2→AN-priv[A-pub[AN-A-sym]]. The second encrypted result R2 is sent to the control panel.

The control panel receives the second encrypted result R2. The encryption processor of the control panel uses its own copy of the server public key (AN-pub) to decrypt the second encrypted result R2 in order to recover the first encrypted result R1. Similarly, the encryption processor or another processor within the control panel uses its own copy of its private key (A-priv) to recover the pairwise symmetric key (AN-N-sym). Since the private key A-priv is known only to the control panel, the resulting pairwise symmetric key AN-N-sym is known only to the server and the control panel.

The control panel may then use the pairwise symmetric key to test the channel with the server. The control panel may do this by using the encryption processor to encrypt a test message using the pairwise symmetric key and comparing a response from the server with a known response. In order to further authenticate the server, the control panel may further encrypt the previously encrypted test message using the public key (AN-pub) of the server. When the response from the server matches the expected response, the response offers further proof of the authenticity of the server.

Registration of each of the sensors, cameras and user interface with the control panel may occur in a similar manner albeit with one or more extra steps to further ensure the authenticity of the respective devices. For example, each of the sensors, cameras or user interface (remote appliance) may attempt to register with the control panel following activation of the remote appliance. In this case, the remote appliance sends the control panel a request to register (RRA) containing the remote appliance's signed GUID and public key where RRA→MS-priv[GUID,A-pub]) of the remote appliance.

The control panel receives the registration message, encrypts it and sends it to the server. In this regard, an encryption processor of the control panel encrypts the registration message (RRA) using the pairwise symmetric key (AN-N-sym) to provide a further encrypted registration message (RRA1) where RRA1→AN-N-sym[MS-priv[GUID,A-pub]].

Within the server, an encryption processor first uses its own version of the pairwise symmetric key (AN-N-sym) to decode the further registration message RRA1 and recover the registration message RRA originally sent by the remote appliance. The encryption processor or other processor of the server may then use its own version of the manufacturer public key (MS-pub) to decode the signed GUID and public key (A-pub) of the remote appliance. Upon recovering the unsigned GUID and public key of the remote appliance, the remote appliance is, thereby, authenticated to the server.

Assuming that the signature of the remote appliance is validated, an encryption processor of the server generates a second pairwise symmetric key (A-A-sym) which will be used to secure sessions between the control panel (the first appliance) and the second (remote) appliance (e.g., sensor, camera, user interface, etc.). In order to send the pairwise symmetric key (A-A-sym) to the remote appliances, the server uses several levels of encryption. First, an encryption processor of the server encrypts the pairwise symmetric key (A-A-sym) using the public key (A-pub) of the remote appliance (that is registering) to produce a first message (M) where M→A-pub[A-A-sym]. The server then signs the first message M using the private key (AN-priv) of the server to produce a second message (M1) where M1→AN-priv[A-pub[A-A-sym]]. Next a processor of the server appends a plaintext version of the pairwise symmetric key (A-A-sym) to the second message and encrypts the composite second message and appended plaintext version using the pairwise symmetric key (AN-A-sym) to produce a third message M2, where M2→AN-N-sym[AN-priv[A-pub[A-A-sym]],A-A-sym]]. The third message (M2) is sent to the control panel.

An encryption processor within the control panel uses its own copy of the pairwise symmetric key (AN-N-sym) to decode the third message M2 and recover the second message M1 and appended pairwise symmetric key (A-A-sym). The control panel saves the pairwise symmetric key (A-A-sym) locally and associates the key with the remote appliance which is registering. The control panel also forwards the second message M1 to the remote appliance.

An encryption processor within the remote appliance uses the server public key (AN-pub) to recover the first message (M). Assuming that the signature was valid and that the key package was created by the alarm network server via a cryptographic comparison, the remote appliance proceeds to the next step. Next, an encryption processor of the sensor decrypts the first message (M) using the remote appliance private key (A-priv) to recover the pairwise symmetric key (A-A-sym).

As above, the appliance verifies the assumption of validation by testing the key (A-A-sym). The sensor may do this by using the encryption processor to encrypt a test message using the pairwise symmetric key (A-A-sym) and comparing a response from the control panel with a known response. In order to further authenticate the control panel, the sensor may further encrypt the previously encrypted test message using the public key (A-pub) of the control panel. When the response from the control matches the expected response, the response offers further proof of the authenticity of the control panel.

In general, a method and apparatus is described where the method includes the steps of generating a globally unique identifier (GUID) for a security system appliance, saving a public key and private key of the security system appliance in a memory of the security system appliance wherein the private and public keys are mathematically linked via an asymmetric cipher, a manufacturer of the security system appliance generating a signed version of the GUID and the public key using a private key of a manufacturer and an asymmetric cipher, saving the signed version of the GUID and public key in the memory of the security system appliance, the security system appliance sending a registration message including the signed version of the GUID and public key to a security system server upon activation of the security system appliance and the security system server authenticating the security system appliance using the signed version of the GUID and public key of the security system appliance and a public key of the manufacturer.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
   setting up a security system that protects a secured area, the security system including a plurality of security system appliances including a sensor of at least one of the plurality of security system appliances within the secured area that detect threats via activation of the sensor, the setting up of the security system further comprises:
   a manufacturer of the a security system appliance of the plurality of security system appliances generating a globally unique identifier (GUID) for the security system appliance;
   the manufacturer saving a public key and private key of the security system appliance and the GUID in a memory of the security system appliance wherein the private and public keys are mathematically linked via an asymmetric cipher;
   the manufacturer of the security system appliance generating a signed version of the GUID and the public key using a private key of a manufacturer where the private key and a public key of the manufacturer are mathematically linked via an asymmetric cipher;
   the manufacturer saving the signed version of the GUID and public key in the memory of the security system appliance;
   the security system appliance automatically registering itself with a corresponding parent device of the plurality of security system appliances within the secured area by sending a registration message including the signed version of the GUID and public key to a security system server through the corresponding parent upon activation of the security system appliance; and
   the security system server authenticating the security system appliance using the signed version of the GUID and public key of the security system appliance and the public key of the manufacturer, the security system appliance further including a copy of the public key of the manufacturer and a public key of the server.

2. The method as in claim 1 further comprising saving a public key of the security system server in the appliance.

3. The method as in claim 1 further comprising the security system server setting up a secure connection with the appliance.

4. The method as in claim 3 further comprising the server generating a pairwise symmetric key that is used for communicating with the appliance.

5. The method as in claim 4 further comprising the server encrypting the pairwise symmetric key with the public key of the appliance.

6. The method as in claim 5 further comprising the server encrypting the pairwise symmetric key previously encrypted with the public key of the appliance with the private key of the server.

7. The method of claim 6 further comprising the server sending the pairwise symmetric key encrypted with the public key of the appliance and private key of the server to the appliance.

8. An apparatus comprising:
   a security system that protects a secured area, the security system includes a plurality of security system appliances including a sensor of at least one of the plurality of security system appliances that detect threats within the secured area via activation of the sensor, the security system further comprises:
   a security system appliance of the plurality of security system appliances, the security system appliance further comprising a globally unique identifier (GUID), a public key and private key saved in a memory of the security system appliance, wherein the public and private keys are mathematically linked via an asymmetric cipher;
   a signed version of the GUID and private key of the security system appliance generated by a manufacturer of the security system appliance using a private key wherein the private key and a public key of the manufacturer are mathematically linked via an asymmetric cipher and wherein the signed GUID and private key are saved in the memory of the security system appliance; and
   a processor of the security system appliance that automatically registers itself with a corresponding parent of the plurality of security system appliances within the secured area, the processor transmits a registration message to the corresponding parent including the signed version of the GUID and public key upon activation of the security system appliance, the security system appliance including a copy of the public key of the manufacturer and a public key of the server.

9. The apparatus as in claim 8 further comprising a security system server, the security system server authenticating the security system appliance using the signed version of the GUID and public key of the security system appliance and the public key of the manufacturer.

10. The apparatus as in claim 8 further comprising a public key of the security system server save in a memory of the appliance.

11. The apparatus as in claim 10 further comprising the security system server setting up a secure connection with the appliance.

12. The apparatus as in claim 11 further comprising a processor of the server that generates a pairwise symmetric key that is used for communicating with the appliance.

13. The apparatus as in claim 12 further comprising a processor of the server that encrypts the pairwise symmetric key with the public key of the appliance.

14. The apparatus as in claim 13 further comprising a processor of the server that encrypts the pairwise symmetric key previously encrypted with the public key of the appliance with the private key of the server.

15. The apparatus of claim 14 further comprising a processor of the server that sends the pairwise symmetric key encrypted with the public key of the appliance and private key of the server to the appliance.

16. The apparatus as in claim 15 wherein the appliance further comprises a controller located in a secure area of the security system.

17. The apparatus as in claim 16 further comprising a processor of the controller that receives a registration message from a remote appliance of the controller where the remote appliance further comprises one of a sensor, a camera and a user interface.

18. The apparatus as in claim 17 further comprising a processor of the controller that encrypts the registration message from the remote controller with the pairwise symmetric key and send the encrypted registration message to the server.

19. The apparatus as in claim 18 further comprising a processor of the server that authenticates the remote appliance via the registration message from the remote appliance.

20. An apparatus comprising:
a security system that protects a secured area, the security system includes a plurality of security system appliances including a sensor of at least one of the plurality of security system appliances within the secured area that detect threats via activation of sensor, the security system further comprises:
a security system appliance of the plurality of security system appliances, the security system appliance further comprising a globally unique identifier (GUID), a public key and private key of the security system appliance, a public key of a security system server, all saved in a memory of the security system appliance, wherein corresponding public and private keys are mathematically linked via an asymmetric cipher;
a signed version of the GUID and public key of the security system appliance generated by a manufacturer of the security system appliance using a private key wherein the private key and a public key of the manufacturer are mathematically linked via an asymmetric cipher, the signed version of the GUID and public key and the public key of the manufacturer are saved in the memory of the security system appliance;
a processor of the security system appliance that automatically registers itself with a corresponding parent of the plurality of security system appliances, the processor transmits a registration message including the signed version of the GUID and public key through the corresponding parent to the security system server upon activation of the security system appliance; and
a processor of the security system server that authenticates the security system appliance using the signed version of the GUID and public key of the security system appliance and the public key of the manufacturer.

* * * * *